US012772067B2

(12) United States Patent
Lei et al.

(10) Patent No.: US 12,772,067 B2
(45) Date of Patent: Oct. 20, 2026

(54) APPARATUSES AND METHODS FOR FACILITATING ADAPTIVE, ON-DEMAND, AND SELF-LEARNING CARRIER AGGREGATION BASED COMMUNICATIONS

(71) Applicant: AT&T Intellectual Property I, L.P., Atlanta, GA (US)

(72) Inventors: Hongyan Lei, Plano, TX (US); Yupeng Jia, South Pasadena, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 291 days.

(21) Appl. No.: 18/589,633

(22) Filed: Feb. 28, 2024

(65) Prior Publication Data

US 2025/0274772 A1 Aug. 28, 2025

(51) Int. Cl.

*H04L 5/00* (2006.01)
*H04W 16/14* (2009.01)
*H04W 72/0453* (2023.01)
*H04W 76/18* (2018.01)

(52) U.S. Cl.

CPC ............ *H04W 16/14* (2013.01); *H04L 5/001* (2013.01); *H04W 72/0453* (2013.01); *H04W 76/18* (2018.02)

(58) Field of Classification Search

None

See application file for complete search history.

(56) References Cited

U.S. PATENT DOCUMENTS

| | | | | |
|---|---|---|---|---|
| 2017/0048839 | A1 * | 2/2017 | Henttonen | H04L 5/0091 |
| 2020/0221271 | A1 * | 7/2020 | Kim | H04L 5/0053 |
| 2022/0132503 | A1 * | 4/2022 | Umeda | H04L 5/001 |
| 2023/0062255 | A1 * | 3/2023 | Takahashi | H04W 72/27 |
| 2023/0069951 | A1 * | 3/2023 | Araujo | H04W 72/0453 |

FOREIGN PATENT DOCUMENTS

| | | | | |
|---|---|---|---|---|
| WO | WO-2019193241 A1 * | 10/2019 | | H04L 5/0098 |

OTHER PUBLICATIONS

"The National Spectrum Strategy", The White House, Washington, Nov. 13, 2023, 26 pp.

* cited by examiner

*Primary Examiner* — The Hy Nguyen

(74) *Attorney, Agent, or Firm* — Guntin & Gust, PLC; Mark Wilinski

(57) ABSTRACT

Aspects of the subject disclosure may include, for example, obtaining a first index from a first user equipment, determining that the first index obtained from the first user equipment corresponds to a second index accessible to the device, resulting in a first determination, selecting, based on the first determination, a first frequency band combination referenced by the second index, and causing the first user equipment to utilize the first frequency band combination for CA based communications. Other embodiments are disclosed.

20 Claims, 7 Drawing Sheets

100

200a

300

600

APPARATUSES AND METHODS FOR FACILITATING ADAPTIVE, ON-DEMAND, AND SELF-LEARNING CARRIER AGGREGATION BASED COMMUNICATIONS

FIELD OF THE DISCLOSURE

The subject disclosure relates to apparatuses and methods for facilitating adaptive, on-demand, and self-learning carrier aggregation based communications.

BACKGROUND

As the world increasingly becomes connected via vast communication networks and systems and via various communication devices, additional opportunities are created/generated to provision communication services. Carrier aggregation (hereinafter "CA") was initially introduced as part of Long Term Evolution (LTE), and represented a breakthrough in terms of providing a capability for combining or "stitching" frequency bands together to facilitate high-speed services. While effective, the use of CA is not without challenges. For example, in some sense the use of CA represents overhead or a penalty to a network/system operator or service provider in terms of a management or handling of all the potential combinations of bands that might be used. Presently, the number of band combinations in Fifth Generation (5G) technology exceeds one thousand, with an expectation that the number will continue to increase as time advances. Furthermore, from a perspective of a client device or user equipment (UE) obtaining access to communication services, two distinct band combinations might not provide the same level of quality of service (QOS) or quality of experience (QoE) in respect of such communication services. As such, a selection of a band combination may impact QoS or QoE.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining or identifying frequency band combinations to utilize for carrier aggregation purposes in respect of one or more communication devices based on a use of profiles and indices. Other embodiments are described in the subject disclosure.

One or more aspects of the subject disclosure include, in whole or in part, obtaining a first index from a first user equipment; determining that the first index obtained from the first user equipment corresponds to a second index accessible to the device, resulting in a first determination; selecting, based on the first determination, a first frequency band combination referenced by the second index; and causing the first user equipment to utilize the first frequency band combination for carrier aggregation (CA) based communications.

One or more aspects of the subject disclosure include, in whole or in part, obtaining an index from a communication device; configuring the communication device to engage in carrier aggregation (CA) based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations; and generating and providing at least one candidate frequency band combination to the communication device when the index does not match any of a plurality of indices accessible to the processing system at the time when the index is obtained from the communication device, wherein the plurality of indices includes the second index.

One or more aspects of the subject disclosure include, in whole or in part, obtaining, by a processing system including a processor, an index pertaining to a use of carrier aggregation (CA) from a first user equipment; determining, by the processing system, that the processing system lacks a profile corresponding to the index at a time that the index is obtained from the first user equipment, resulting in a first determination; sending, by the processing system and based on the first determination, a request to a second processing system for an indication of whether the second processing system has a copy of the profile corresponding to the index; receiving, by the processing system and based on the sending of the request, a response from the second processing system indicating that the second processing system has the copy of the profile corresponding to the index, the response including the copy of the profile; and storing, by the processing system and based on the receiving, the copy of the profile, resulting in a stored profile.

Figure 1:
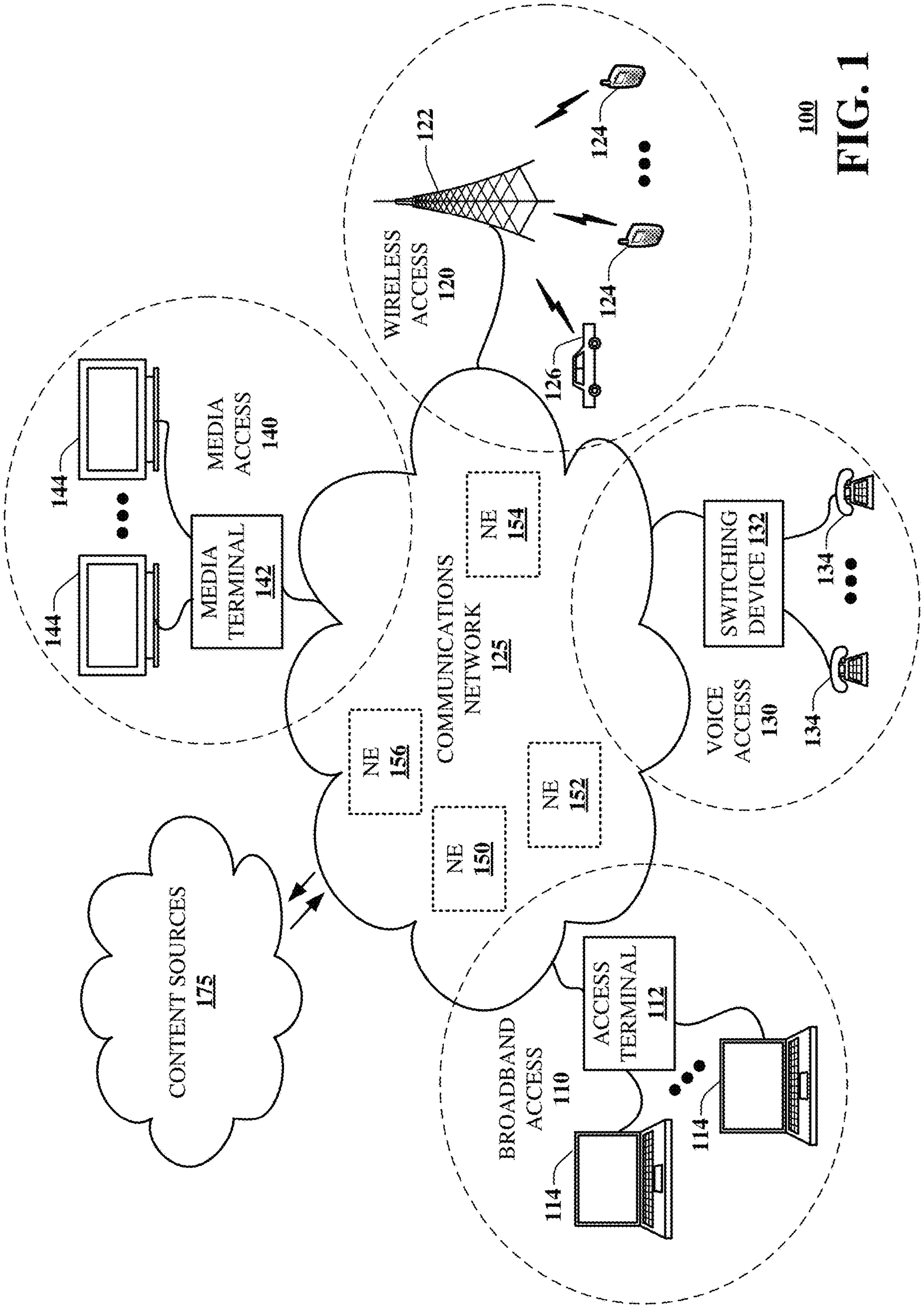
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, the system 100 can facilitate, in whole or in part, obtaining a first index from a first user equipment, determining that the first index obtained from the first user equipment corresponds to a second index accessible to the device, resulting in a first determination, selecting, based on the first determination, a first frequency band combination referenced by the second index, and causing the first user equipment to utilize the first frequency band combination for CA based communications. The system 100 can facilitate, in whole or in part, obtaining an index from a communication device, configuring the communication device to engage in CA based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations, and generating and providing at least one candidate frequency band combination to the communication device when the index does not match any of a plurality of indices accessible to the processing system at the time when the index is obtained from the communication device, wherein the plurality of indices includes the second index. The system 100 can facilitate, in whole or in part, obtaining, by a processing system including a processor, an index pertaining to a use of CA from a first user equipment, determining, by the processing system, that the processing system lacks a profile corresponding to the index at a time that the index is obtained from the first user equipment, resulting in a first determination, sending, by the processing system and based on the first determination, a request to a second processing system for an indication of whether the second processing system has a copy of the profile corresponding to the index, receiving, by the processing system and based on the sending of the request, a response from the second processing system indicating that the second processing system has the copy of the profile corresponding to the index, the response including the copy of the profile, and storing, by the processing system and based on the receiving, the copy of the profile, resulting in a stored profile.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
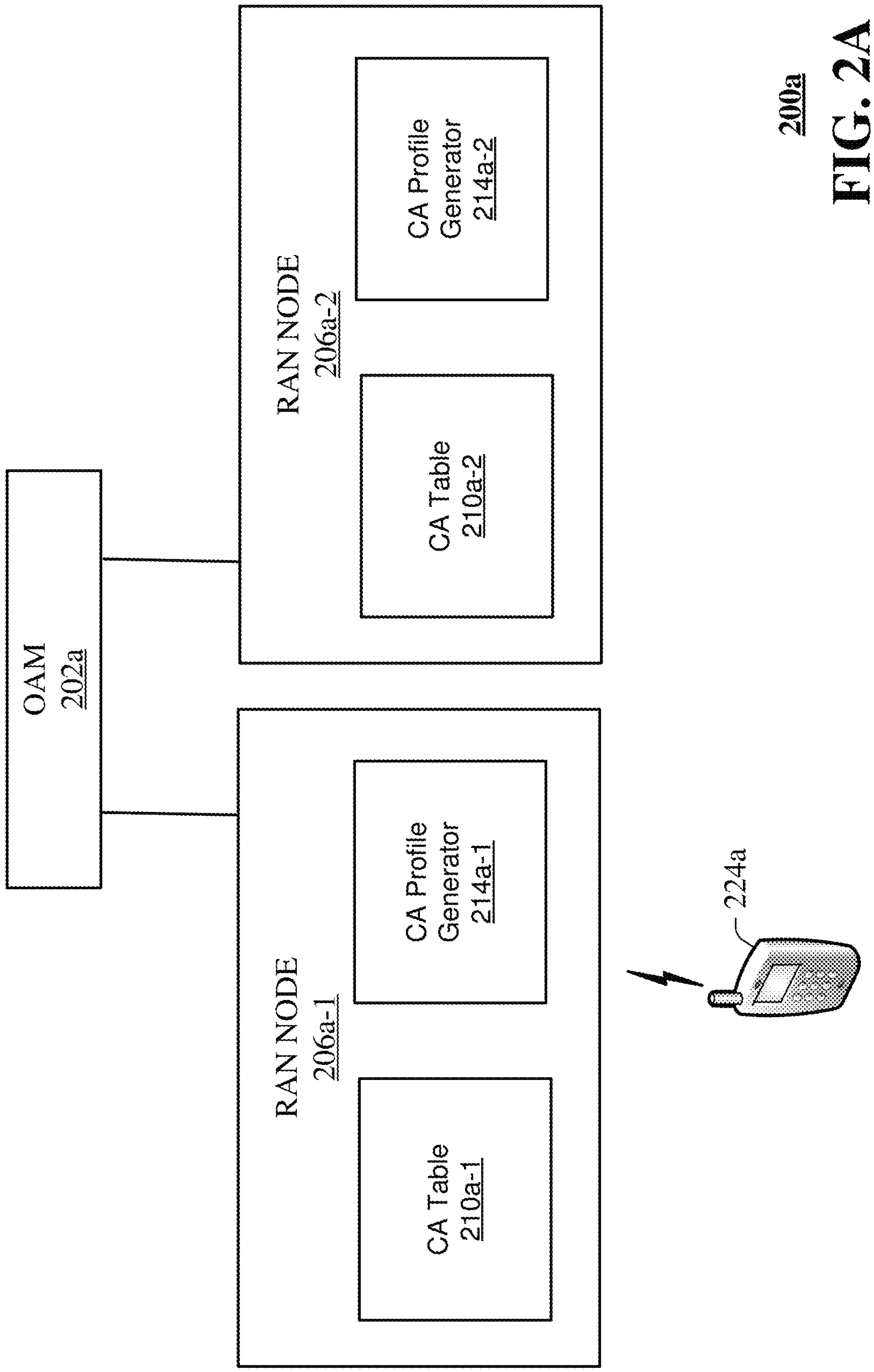
FIG. 2A is a block diagram illustrating an example, non-limiting embodiment of a system in accordance with various aspects described herein.

FIG. 2A is a block diagram illustrating an example, non-limiting embodiment of a system 200*a* in accordance with various aspects described herein. In some embodiments, one or more parts/portions of the system 200*a* may be operatively overlaid upon, or combined with, one or more parts/portions of the system 100 of FIG. 1.

The system 200*a* may include one or more entities, such as operations and management (OAM) 202*a*, a first radio access network (RAN) node 206*a*-1, and a second RAN node 206*a*-2. While two RAN nodes (206*a*-1 and 206*a*-2) are shown in FIG. 2A, it is understood and appreciated that a different count/number of RAN nodes may be utilized or included in a given embodiment. Each of the RAN nodes 206*a*-1 and 206*a*-2 may be communicatively coupled to the OAM 202*a* via one or more links, channels, or the like. As described in further detail below, the RAN nodes 206*a*-1 and 206*a*-2 may be used to provide user equipment (UE) or client devices access to communication services using one or more technologies. In some embodiments, one or both of the RAN nodes 206*a*-1 and 206*a*-2 may correspond to, or include, a base station (e.g., eNB, gNB, etc.).

The first RAN node 206*a*-1 may include a first carrier aggregation (CA) table 210*a*-1 and a first CA profile generator 214*a*-1. Similarly, the second RAN node 206*a*-2 may include a second CA table 210*a*-2 and a second CA profile generator 214*a*-2. The first CA profile generator 214*a*-1 and the second CA profile generator 214*a*-2 may correspond to respective instances of a common CA profile generator, although customizations or tailoring may be enabled at a respective RAN node to allow the respective RAN node to discharge its duties or obligations as it relates to a provisioning of communication services. For reasons that will become clearer below, in some embodiments portions of the CA tables 210*a*-1 and 210*a*-2 may be replicated at the OAM 202*a*. In the description that follows, particular focus will be placed on operations involving the first RAN node 206*a*-1, with the understanding that such operations may also occur at or involve the second RAN node 206*a*-2 in some embodiments or scenarios.

In operation, a UE 224*a* may attempt to access one or more communication services. For example, when the UE 224*a* is powered-on or moves within a communication range of the first RAN node 206*a*-1, the UE 224*a* may attempt to establish a connection with the first RAN node 206*a*-1. As part of that connection attempt, the UE 224*a* may transmit information that may include a CA profile index pertinent to the UE 224*a*. The CA profile index, which may be pre-provisioned in the UE 224*a* (such as, for example, at a time when the UE 224*a* is manufactured/fabricated, during a software update to the UE 224*a*, etc.), may be representative of a make-and-model of the UE 224*a*. Stated differently, the hardware/firmware of the UE 224*a* may establish limits on the bands, or combinations of bands, that the UE 224*a* is capable of utilizing. To demonstrate, if the UE 224*a* is an "older device" (e.g., 3 years old), there may be frequency bands that an operator "recently" (e.g., within the past year) gained access to (such as, via an auction proceeding) that the UE 224*a* is incapable of accommodating.

The first RAN node 206*a*-1 may obtain the transmission of the information by/from the UE 224*a* and may determine whether the CA profile index included as part of that information is referenced in the first CA table 210*a*-1. If so, the first RAN node 206*a*-1 may access information associated with that index from the first CA table 210*a*-1. To demonstrate, for each index stored within the first CA table 210*a*-1, there may be: (1) an indication of one or more bands that are supported, and (2) band combinations that may be used together for CA purposes. An example of the first CA table 210*a*-1, at a particular moment in time, is represented in Table 1 below:

TABLE 1

Example of a CA table

| CA profile index | Band(s) supported | Band combinations |
|---|---|---|
| 1 | A, B, C, D | A-B, B-C, C-D |
| 2 | A, C, F, K, L | A-C, C-K, F-L, K-L |
| 3 | C, E, K, X | C-K, E-X |

In the example of Table 1 above, the letters A, B, C, D, E, F, K, L, and X in the Band(s) supported column may be representative of the frequency bands that a given UE with the specified index is capable of supporting/utilizing. For example, a UE with a CA profile index of 1 may be capable of supporting/utilizing any of bands A, B, C, and D, generally. However, it may be the case (due to technological constraints) that the UE is incapable of supporting particular combinations of those bands A, B, C, and D, or that particular combinations are more preferred relative to others, for CA purposes. In this respect, the Band combinations column in Table 1 reflects that band combinations of A-B, B-C, and C-D are the ones that must be used for a CA profile index of 1, or are more preferably used, relative to other combinations (such as A-D, for example) that otherwise could be formed from the Band(s) supported for the CA profile index of 1.

Continuing the above example, and assuming that the UE 224*a* provides/transmits a CA profile index that is included in the first CA table 210*a*-1, the first RAN node 206*a*-1 may select one of the band combination(s) that may be included in the first CA table 210*a*-1 for that CA profile index and may cause the UE 224*a* to be configured to use that selected band combination (such as, for example, via a transmission of a signal, a message, or the like).

On the other hand, if the CA profile index provided/transmitted by the UE 224*a* does not match any of the indices that are currently included/stored in the first CA table 210*a*-1 (such as, for example, a CA profile index of 4 in the context of Table 1 shown above), the first RAN node 206*a*-1 may communicate with the OAM 202*a* to determine if the OAM 202*a* has an entry corresponding to the CA profile index provided/transmitted by the UE 224*a*. For example, it may be the case that the first RAN node 206*a*-1 is relatively new and has never previously encountered the CA profile index provided/transmitted by the UE 224*a*. In this respect, the OAM 202*a* may have (a copy of) an entry for the CA profile index that may be sourced from another entity, such as for example the second RAN node 206*a*-2 (or another entity). Assuming that the OAM 202*a* has an entry for the CA profile index in question, a copy of the entry may be conveyed from the OAM 202*a* to the first RAN node 206*a*-1. Once the first RAN node 206*a*-1 obtains the copy of the entry, the procedure may proceed along the lines of the above (e.g., the first RAN node 206*a*-1 may save/store the copy of the entry and may apply it for facilitating communication services to the UE 224*a*).

Continuing the above example, and assuming a scenario where the CA profile index provided/transmitted by the UE 224*a* does not match any of the indices that are currently included/stored in the first CA table 210*a*-1 or the OAM 202*a* (where the lack of such a match in the OAM 202*a* may be communicated by the OAM 202*a* to the first RAN node 206*a*-1), the first CA profile generator 214*a*-1 may be activated/invoked to generate a recommendation/suggestion for a band combination to be used by the UE 224*a*. In this respect, the first CA profile generator 214*a*-1 may utilize machine learning (ML) and/or artificial intelligence (AI) to select one or more candidate band combinations for potential use by the UE 224*a*. The recommended/suggested band combination (e.g., a selected one of the candidates) may be communicated by the first RAN node 206*a*-1 to the UE 224*a*. Assuming that the UE 224*a* is able/capable of supporting the recommended/suggested band combination, the UE 224*a* may acknowledge/confirm an acceptance of the same to the first RAN node 206*a*-1 and CA based communications may then occur using that band combination. Conversely, if the UE 224*a* is incapable of supporting the recommended/suggested band combination, the UE 224*a* may reject the band combination (potentially as part of a signal or message conveyed by the UE 224*a* to the first RAN node 206*a*-1). Based on the rejection of the band combination, the first RAN node 206*a*-1 may select another, different one of the candidates (if any) and may provide/present the same to the UE 224*a* for evaluation. This process of the first RAN node 206*a*-1 presenting candidate band combinations to the UE 224*a* may continue until the earliest of: (1) a candidate band combination is accepted by the UE 224*a*, (2) the candidates have been exhausted, or (3) some timeout or expiration (e.g., a maximum number of tries/attempts) has been reached.

Any status (e.g., acceptance, rejection) generated as between the UE 224*a* and the first RAN node 206*a*-1 may be entered as part of the first CA table 210*a*-1. For example, if the UE 224*a* rejects a candidate band combination, a note of the same may be entered relative to the CA profile index to avoid utilizing that band combination with the UE 224*a* (or another, comparable UE that utilizes that same index) in the future. Conversely, if the UE 224*a* accepts a candidate band combination, that band combination may be included/entered relative to the CA profile index in the first CA table 210*a*-1 to allow that band combination to be used by the UE 224*a* (or another, comparable UE that utilizes that same index) in the future. In this manner, as time progresses it is anticipated that the information/data contained within the first CA table 210*a*-1 may grow/increase as additional indices are encountered and/or as the number of bands increases.

It is appreciated that while various features were described above in relation to the OAM 202*a*, the first RAN node 206*a*-1 and the second RAN node 206*a*-2, the features may be selectively allocated amongst one or more of these entities without any loss in accuracy of description. For example, in embodiments where a reduction of latency is of particular interest or value, it may make sense to maintain respective CA tables at the RAN nodes to reduce (e.g., avoid) the delay/signaling overhead between the RAN node and the OAM 202*a*. Conversely, in embodiments where an overall reduction in the amount of storage is of particular interest or value, a single, master copy of a CA table (and CA profile generator) may be stored/maintained at a central location (e.g., the OAM 202*a*), and the RAN nodes may leverage/access those resources when needed to facilitate communication service access for client devices/UEs. In general, any form or type of centralized or distributed computing/communication architecture or platform may be utilized to effectuate the methodological acts and processes set forth herein.

As set forth above, ML and/or AI technologies may be utilized to facilitate recommendations or suggestions for (candidate) band combinations that could potentially be used for CA purposes. The band combinations may be identified/determined based on a consideration of one or more conditions, factors, or parameters. For example, and all other conditions being assumed equal, from the perspective of a network/operator or service provider it may generally be desirable to attempt to balance traffic/load (potentially relative to, or within, one or more thresholds) across some or all of the potentially available bands. In this respect, if a first band (or a first combination of bands) is under-utilized relative to a second band (or a second combination of bands), it may make the most sense to attempt to allocate the next connection attempt by a UE to the first band (or the first combination of bands). In another scenario, it may be assumed that a given UE is shared amongst members of a family, where during daylight hours the UE is primarily utilized by a head-of-household (e.g., a mother or father) for business purposes, whereas in the evening/nighttime hours the UE is utilized by other members of the family (e.g., children) for entertainment purposes (e.g., gaming, watching videos, texting with friends, etc.). The split or differing uses of the UE amongst the different members of the family may suggest a utilization of different bands or band combinations during daylight hours relative to evening/nighttime hours (as different bands or band combinations may provide for differing QoS or QoE depending on the particular application(s) being executed).

In some embodiments, particular bands or band combinations may inherently provide for higher levels of QoS or QoE, and users (or associated devices) may obtain access to those bands or band combinations upon payment of a subscription fee (or the like). Alternatively, or additionally, access to those bands or band combinations may be reserved for critical services or applications (e.g., first responder services or applications). In some embodiments, a network/system operator or service provider may attempt to allocate/assign communication devices to those bands or band combinations that have a highest-capability (in terms of, e.g., data transfer throughput or rate) that are available, which in turn may enhance QoS or QoE (and thus, may promote customer/subscriber loyalty).

Figure 2B:
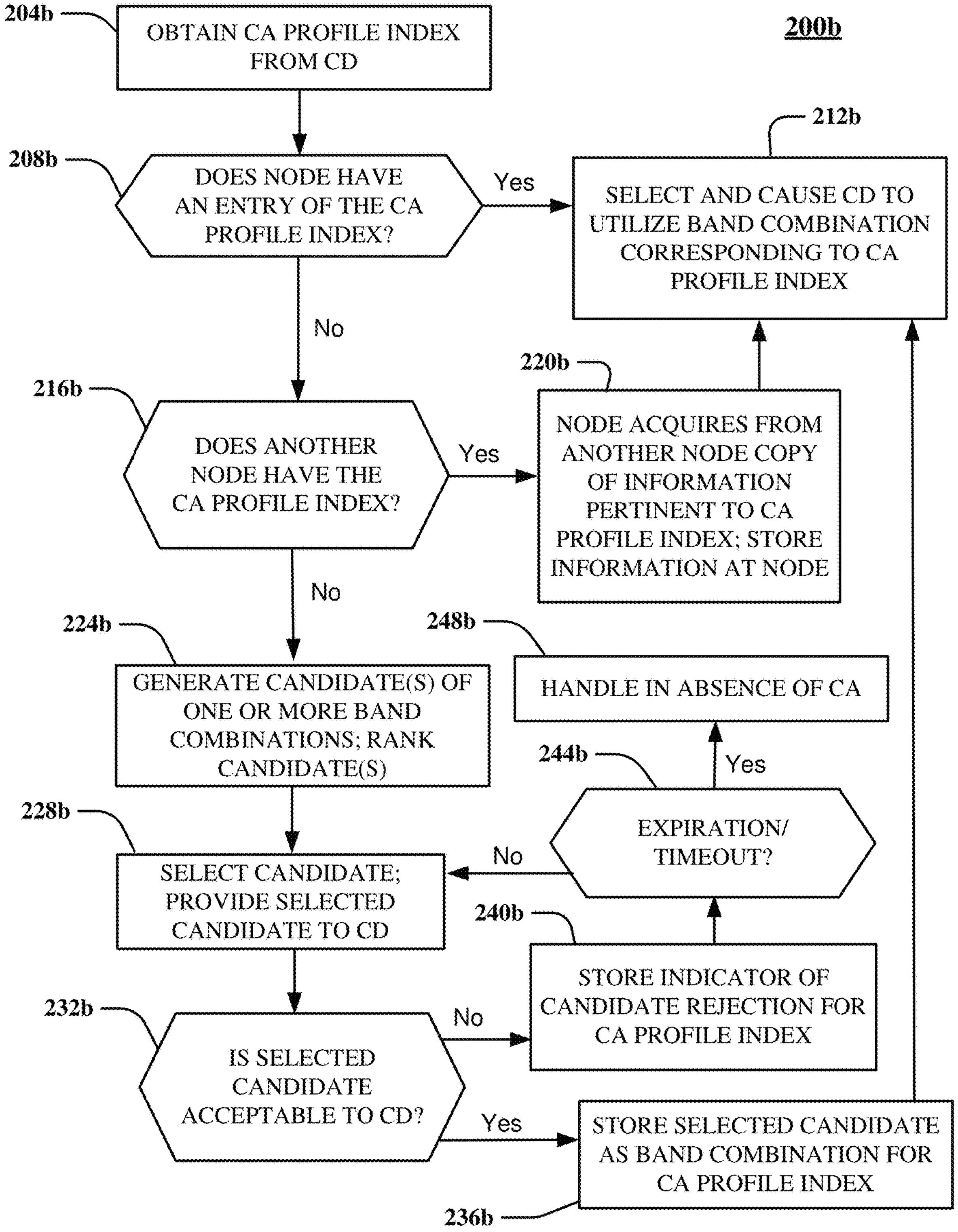
FIG. 2B depicts an illustrative embodiment of a method in accordance with various aspects described herein.

Referring now to FIG. 2B, an illustrative embodiment of a method 200*b* in accordance with various aspects described herein is shown. The method 200*b* may be implemented (e.g., executed), in whole or in part, in conjunction with one or more systems, networks, devices, and/or components, such as for example the systems, networks, devices, and components described herein. The method 200*b* may facilitate a performance of operations, where such operations may be represented by the blocks shown in FIG. 2B. In some embodiments, the operations may be facilitated via instructions that may be executed by one or more processing systems (where each such processing system may include one or more processors).

In block 204*b*, a node (e.g., a RAN node) may obtain from a communication device (CD), such as a UE, information including a CA profile index.

In block 208*b*, the node may determine whether the node has an entry (such as part of a table) of the CA profile index obtained as part of block 204*b*. If so, flow may proceed from block 208*b* to block 212*b*; otherwise, flow may proceed from block 208*b* to block 216*b*.

In block 212*b*, the node may select and cause the CD to utilize a band combination corresponding to the CA profile index. To the extent that there are multiple band combinations available, ML and/or AI based technologies may be utilized to determine/identify which of the multiple band combinations that the CD should utilize. The node may transmit a message, a signal, or the like to the CD that causes the CD to utilize the (selected/determined/identified) band combination. As part of block 212*b*, the CD may engage in CA based communications.

In block 216*b*, a determination may be made whether another node (e.g., an OAM, another RAN node, etc.) has an entry stored therein corresponding to the CA profile index obtained as part of block 204*b*. In this regard, the node may send a request to the another node to solicit a response in respect of whether the another node has such an entry. If, based on the response, the another node does have such an entry, flow may proceed from block 216*b* to block 220*b*; otherwise, flow may proceed from block 216*b* to block 224*b*.

In block 220*b*, the node may acquire from the another node (of block 216*b*) a copy of information pertinent to the CA profile index present at the another node. For example, such information may be acquired in conjunction with the response from the another node as part of block 216*b*. That information (which may include an identification of band(s) supported or band combinations as illustrated in respect of Table 1 above, for example) may be stored by the node as part of block 220*b*. From block 220*b*, flow may proceed to block 212*b* to cause the CD to use a band combination for CA based communications.

In block 224*b*, the node may generate one or more candidate band combinations. For example, the generation of the candidates may be facilitated by a CA profile generator (see, e.g., CA profile generators 214*a*-1 and 214*a*-2 in FIG. 2A). As part of block 224*b*, the candidates may be ordered or ranked, potentially assigning a relative priority or preference to each candidate relative to the other candidates. The ranking may be based on a perceived or probabilistic likelihood that the candidate will be accepted by the CD, may be based on user or device preference, may be based on having the next-highest capability (e.g., capacity for transferring data), or may be based on other criteria or considerations. From block 224*b*, flow may proceed to block 228*b*.

In block 228*b*, to the extent that there is more than one candidate generated as part of block 224*b*, the next candidate may be selected as part of block 228*b*. The order of selection of the next candidate amongst multiple candidates may follow from the ranking performed as part of block 224*b*; for example, the next highest priority candidate that is still available (and has not been rejected by the CD) may be selected. The selection of block 228*b* may be conveyed to the CD via one or more signals, messages, or the like.

In block 232*b*, a determination may be made whether the CD has accepted the selected candidate of block 232*b*. The determination of block 232*b* may be facilitated via a response from the CD, which may take the form of a signal, a message, or the like. If the CD has accepted the selected candidate, flow may proceed from block 232*b* to block 236*b*; otherwise, flow may proceed from block 232*b* to block 240*b*.

In block 236*b*, the selected candidate (of block 228*b*) may be stored by the node as a band combination in conjunction with the CA profile index. This acceptance may also be conveyed by the node to other nodes as part of block 236*b*. From block 236*b*, flow may proceed to block 212*b* to cause the CD to use the selected candidate band combination (of block 228*b*) for CA based communications.

In block 240*b*, an indicator of status of rejection by the CD in respect of the selected candidate may be stored by the node in conjunction with the CA profile index. This indicator of status of rejection may be conveyed by the node to other nodes as part of block 240*b*. From block 240*b*, flow may proceed to block 244*b*.

In block 244*b*, a determination may be made whether an expiration, timeout, or the like has been reached. Block 244*b* may include considerations of the kind/type referenced above, such as for example whether the candidates (generated as part of block 224*b*) have been exhausted in terms of presentation/conveyance to the CD or some maximum number of tries/attempts has been reached. If so, flow may proceed from block 244*b* to block 248*b*; otherwise, flow may proceed from block 244*b* to block 228*b*. The flow from block 244*b* to block 228*b* may cause the next candidate to be selected (in block 228*b*); for example, as part of the flow from block 244*b* to block 228*b*, the next highest-ranked candidate may be selected from the pool of candidates, acknowledging the rejection of the latest selected candidate as part of blocks 232*b* and 240*b*.

In block 248*b*, communications involving the CD may be handled in the absence of CA. For example, as part of block 248*b*, the node may cause the CD to simply use a single frequency band, may attempt to hand-over communications to a different node, etc.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As set forth herein, ML and/or AI may be used to facilitate a generation and utilization of a CA list/table for providing communication services to communication devices (e.g., client devices/UEs). Metrics may be collected and analyzed/monitored to determine or identify frequency bands (or frequency band combinations) that yield sufficient performance in a provisioning of a communication service. Customizations or tailoring may be provided or utilized to respond to particularly unique circumstances or conditions (e.g., signal fading near a perimeter of a cell), while at the same time attempting to encourage efficiency or re-use via an indexing scheme as set forth herein. In some embodiments, a value of a frequency band or frequency band combination may be assessed or estimated prior to acquiring it; this in turn may drive a bid or offer that is placed.

Aspects of this disclosure may reduce the amount of work or overhead incurred to align a RAN node and UE in respect of frequency band combinations for CA purposes. Considerable cost may be saved in terms of planning, testing, maintaining and operating a system or network based on a utilization of the various aspects of this disclosure. Aspects of this disclosure may reduce the amount of signaling that is required or needed to arrive at an acceptable frequency band combination for CA purposes. Ranking and prediction techniques may be deployed/utilized to arrive at optimum solutions or configurations in a shorter amount of time. Further, as demonstrated herein, spectrum planning/allocation activities may benefit from CA-based predictions. In brief, and as demonstrated herein, the various aspects of this disclosure represent substantial improvements to technology as part of numerous practical applications involving communication networks and systems. In this respect, and as one of skill in the art will appreciate, the various aspects of this disclosure are not directed to abstract ideas. To the contrary, the various aspects of this disclosure are directed to, and encompass, significantly more than any abstract idea standing alone.

Figure 3:
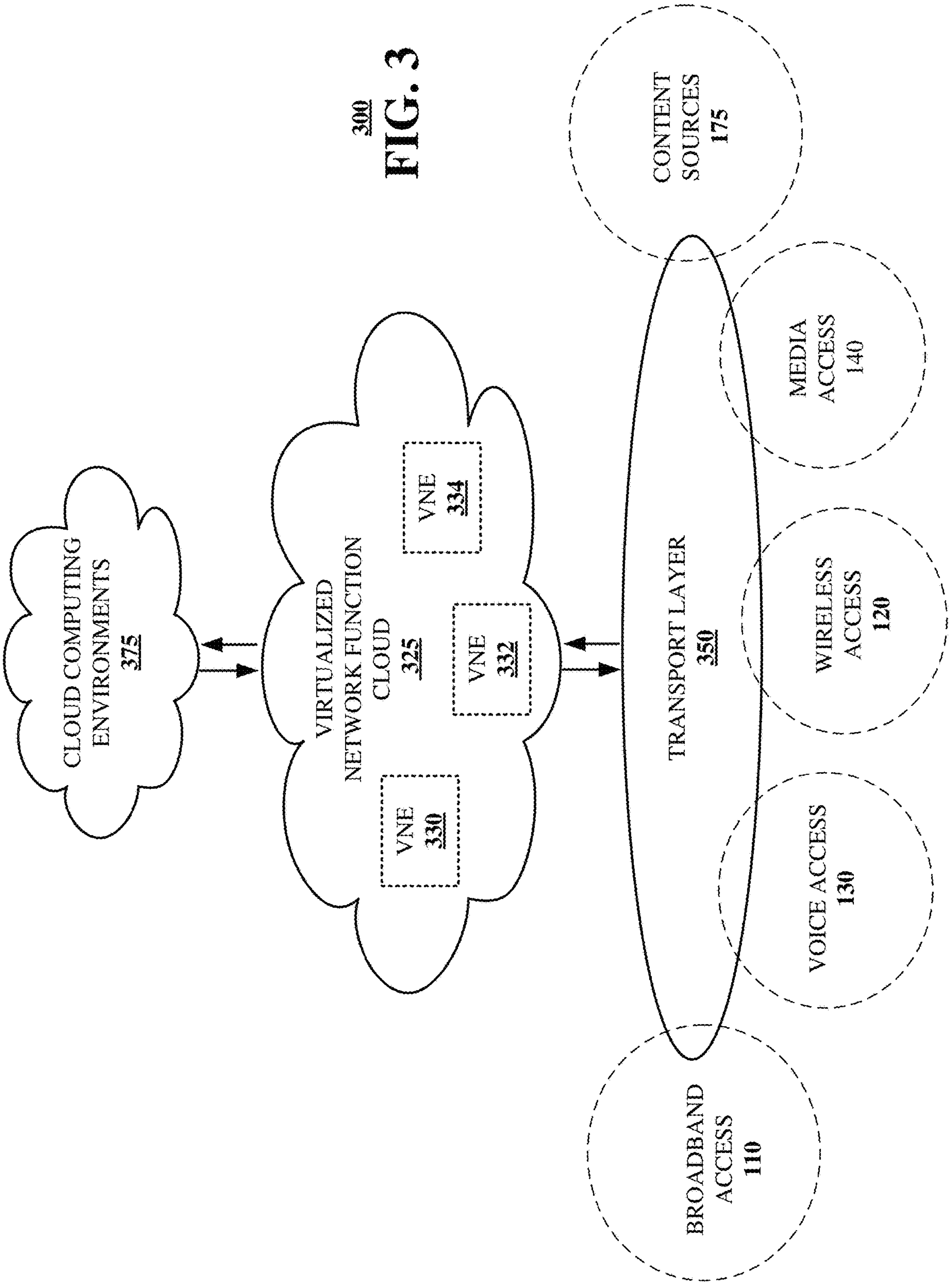
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200*a*, and method 200*b* presented in FIGS. 1, 2A, and 2B. For example, the virtualized communication network 300 can facilitate, in whole or in part, obtaining a first index from a first user equipment, determining that the first index obtained from the first user equipment corresponds to a second index accessible to the device, resulting in a first determination, selecting, based on the first determination, a first frequency band combination referenced by the second index, and causing the first user equipment to utilize the first frequency band combination for CA based communications. The virtualized communication network 300 can facilitate, in whole or in part, obtaining an index from a communication device, configuring the communication device to engage in CA based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations, and generating and providing at least one candidate frequency band combination to the communication device when the index does not match any of a plurality of indices accessible to the processing system at the time when the index is obtained from the communication device, wherein the plurality of indices includes the second index. The virtualized communication network 300 can facilitate, in whole or in part, obtaining, by a processing system including a processor, an index pertaining to a use of CA from a first user equipment, determining, by the processing system, that the processing system lacks a profile corresponding to the index at a time that the index is obtained from the first user equipment, resulting in a first determination, sending, by the processing system and based on the first determination, a request to a second processing system for an indication of whether the second processing system has a copy of the profile corresponding to the index, receiving, by the processing system and based on the sending of the request, a response from the second processing system indicating that the second processing system has the copy of the profile corresponding to the index, the response including the copy of the profile, and storing, by the processing system and based on the receiving, the copy of the profile, resulting in a stored profile.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
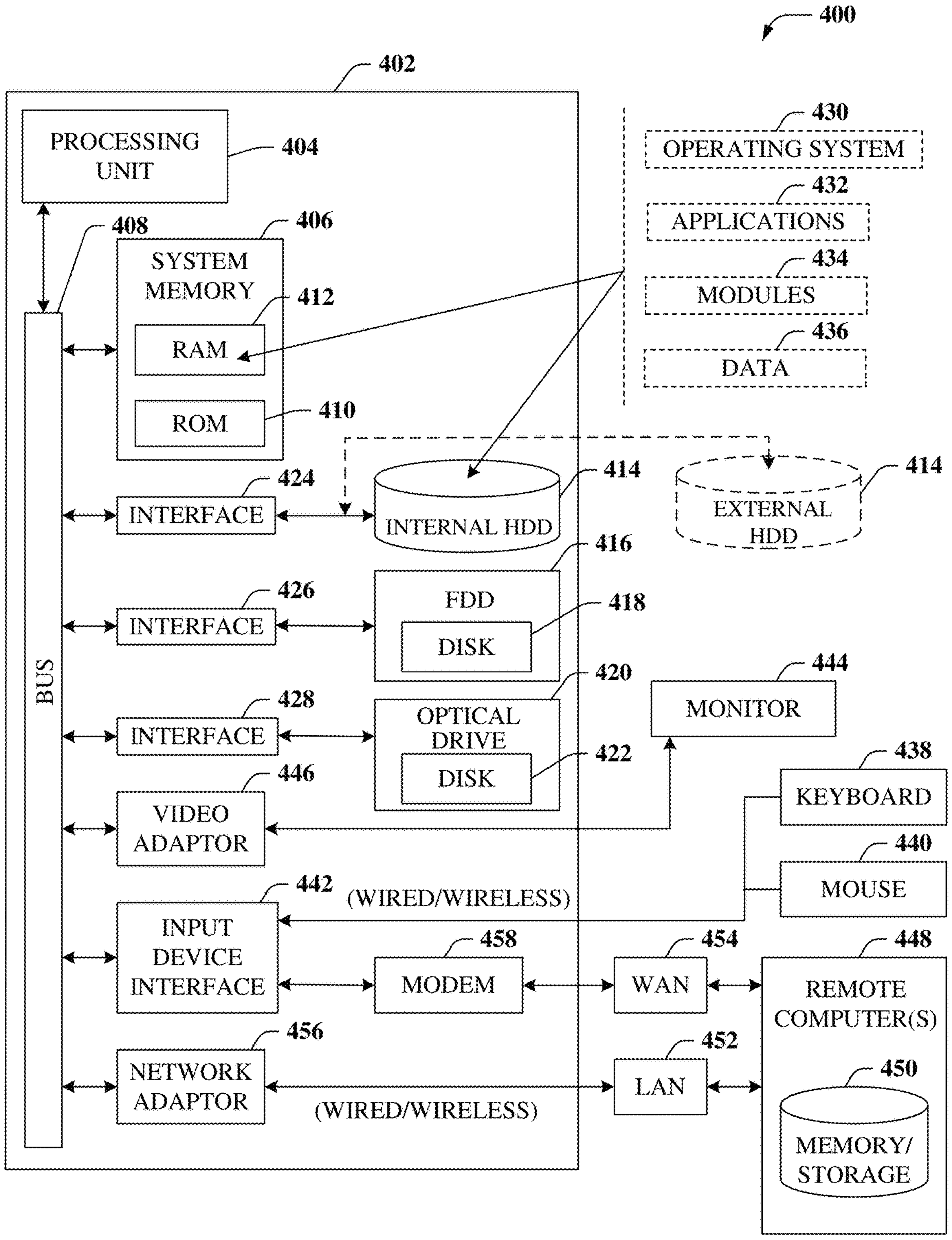
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate, in whole or in part, obtaining a first index from a first user equipment, determining that the first index obtained from the first user equipment corresponds to a second index accessible to the device, resulting in a first determination, selecting, based on the first determination, a first frequency band combination referenced by the second index, and causing the first user equipment to utilize the first frequency band combination for CA based communications. The computing environment 400 can facilitate, in whole or in part, obtaining an index from a communication device, configuring the communication device to engage in CA based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations, and generating and providing at least one candidate frequency band combination to the communication device when the index does not match any of a plurality of indices accessible to the processing system at the time when the index is obtained from the communication device, wherein the plurality of indices includes the second index. The computing environment 400 can facilitate, in whole or in part, obtaining, by a processing system including a processor, an index pertaining to a use of CA from a first user equipment, determining, by the processing system, that the processing system lacks a profile corresponding to the index at a time that the index is obtained from the first user equipment, resulting in a first determination, sending, by the processing system and based on the first determination, a request to a second processing system for an indication of whether the second processing system has a copy of the profile corresponding to the index, receiving, by the processing system and based on the sending of the request, a response from the second processing system indicating that the second processing system has the copy of the profile corresponding to the index, the response including the copy of the profile, and storing, by the processing system and based on the receiving, the copy of the profile, resulting in a stored profile.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms “tangible” or “non-transitory” herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term “modulated data signal” or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
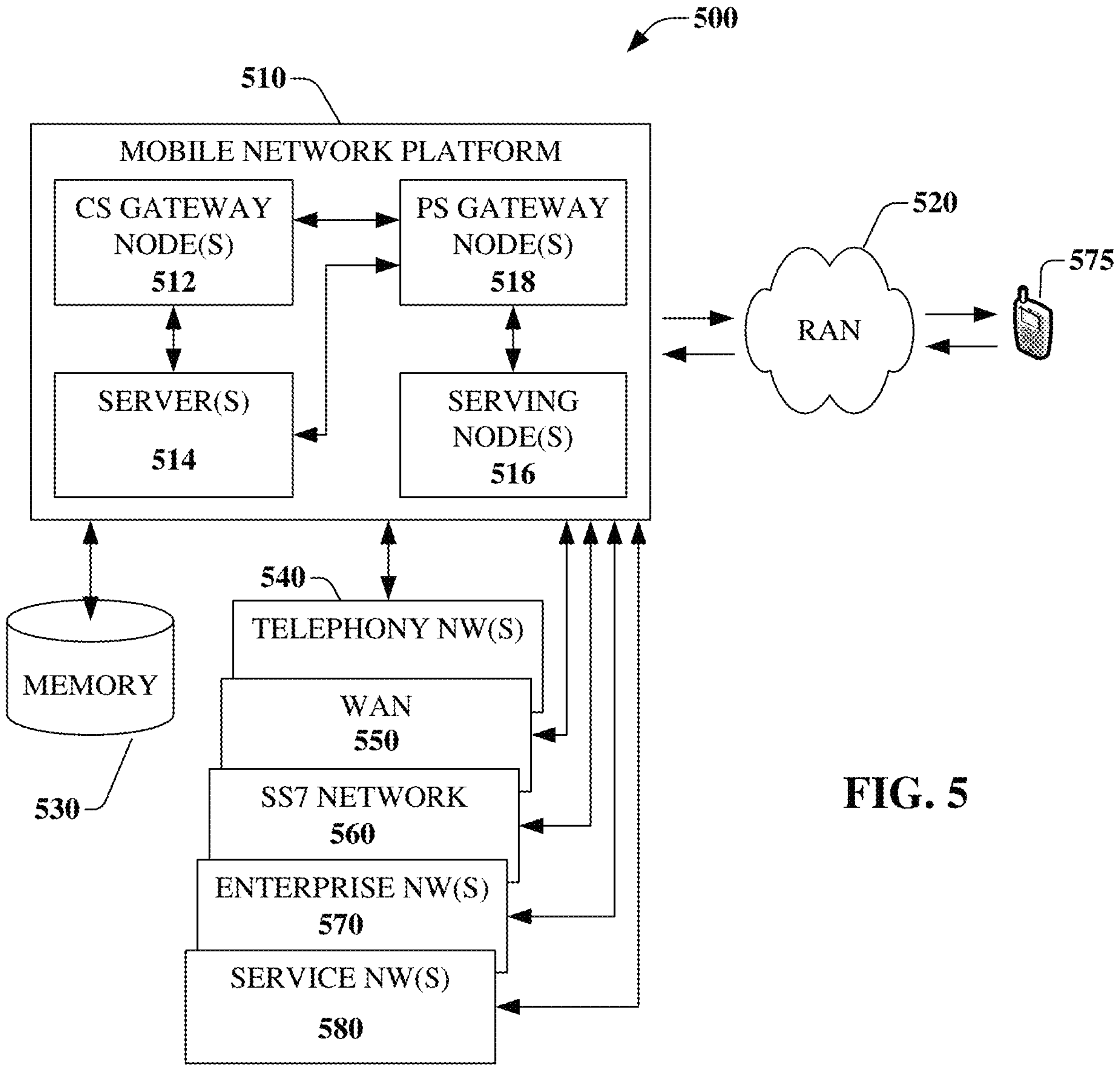
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 can facilitate, in whole or in part, obtaining a first index from a first user equipment, determining that the first index obtained from the first user equipment corresponds to a second index accessible to the device, resulting in a first determination, selecting, based on the first determination, a first frequency band combination referenced by the second index, and causing the first user equipment to utilize the first frequency band combination for CA based communications. The platform 510 can facilitate, in whole or in part, obtaining an index from a communication device, configuring the communication device to engage in CA based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations, and generating and providing at least one candidate frequency band combination to the communication device when the index does not match any of a plurality of indices accessible to the processing system at the time when the index is obtained from the communication device, wherein the plurality of indices includes the second index. The platform 510 can facilitate, in whole or in part, obtaining, by a processing system including a processor, an index pertaining to a use of CA from a first user equipment, determining, by the processing system, that the processing system lacks a profile corresponding to the index at a time that the index is obtained from the first user equipment, resulting in a first determination, sending, by the processing system and based on the first determination, a request to a second processing system for an indication of whether the second processing system has a copy of the profile corresponding to the index, receiving, by the processing system and based on the sending of the request, a response from the second processing system indicating that the second processing system has the copy of the profile corresponding to the index, the response including the copy of the profile, and storing, by the processing system and based on the receiving, the copy of the profile, resulting in a stored profile.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format) such flows. Such application (s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
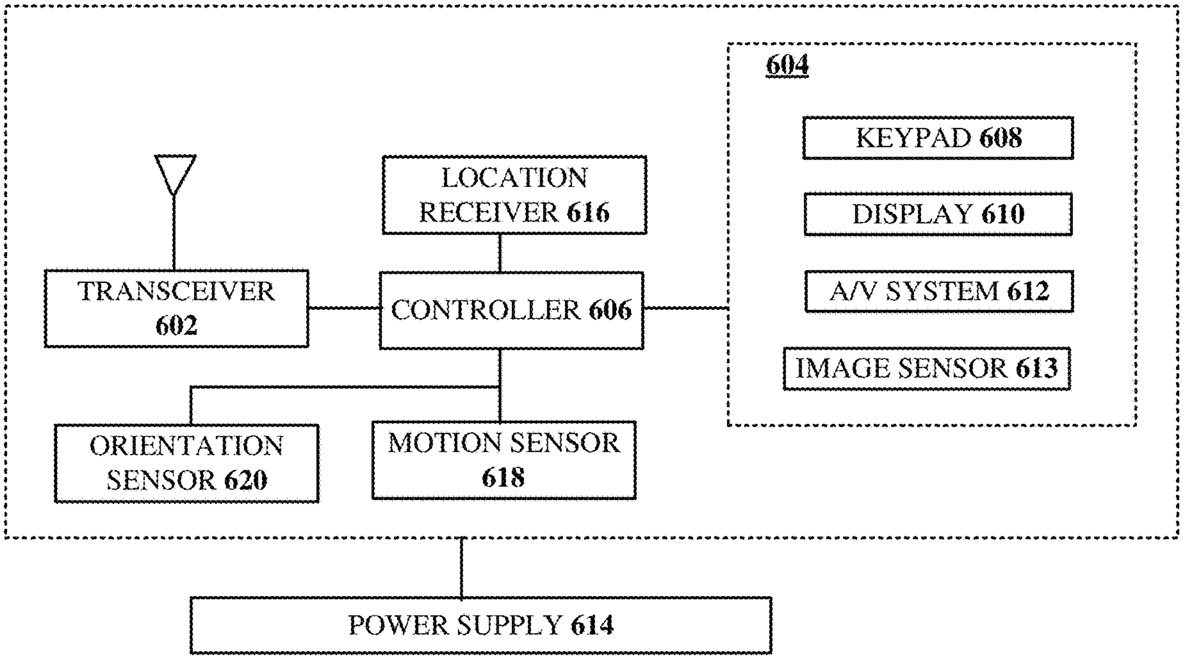
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 can facilitate, in whole or in part, obtaining a first index from a first user equipment, determining that the first index obtained from the first user equipment corresponds to a second index accessible to the device, resulting in a first determination, selecting, based on the first determination, a first frequency band combination referenced by the second index, and causing the first user equipment to utilize the first frequency band combination for CA based communications. The computing device 600 can facilitate, in whole or in part, obtaining an index from a communication device, configuring the communication device to engage in CA based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations, and generating and providing at least one candidate frequency band combination to the communication device when the index does not match any of a plurality of indices accessible to the processing system at the time when the index is obtained from the communication device, wherein the plurality of indices includes the second index. The computing device 600 can facilitate, in whole or in part, obtaining, by a processing system including a processor, an index pertaining to a use of CA from a first user equipment, determining, by the processing system, that the processing system lacks a profile corresponding to the index at a time that the index is obtained from the first user equipment, resulting in a first determination, sending, by the processing system and based on the first determination, a request to a second processing system for an indication of whether the second processing system has a copy of the profile corresponding to the index, receiving, by the processing system and based on the sending of the request, a response from the second processing system indicating that the second processing system has the copy of the profile corresponding to the index, the response including the copy of the profile, and storing, by the processing system and based on the receiving, the copy of the profile, resulting in a stored profile.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x)

=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
- a processing system including a processor; and
- a memory that stores executable instructions that, when executed by the processing system, facilitate performance of operations, the operations comprising:
- obtaining a first index from a first user equipment;
- determining that the first index obtained from the first user equipment corresponds to a second index accessible to the device, resulting in a first determination;
- selecting, based on the first determination, a first frequency band combination referenced by the second index; and
- causing the first user equipment to utilize the first frequency band combination for carrier aggregation (CA) based communications,
- wherein the second index is accessible to the device based on the second index being stored at a second device at a time of the obtaining of the first index.

2. The device of claim 1, wherein the second index is accessible to the device based on the second index being stored at the device at a time of the obtaining of the first index.

3. The device of claim 1, wherein the operations further comprise:
- obtaining a copy of the second index and the first frequency band combination from the second device.

4. The device of claim 3, wherein the operations further comprise:
- storing the copy of the second index and the first frequency band combination at the device.

5. The device of claim 1, wherein the operations further comprise:
- obtaining the first index from a second user equipment; and
- determining that the first index obtained from the second user equipment corresponds to the second index accessible to the device, resulting in a second determination.

6. The device of claim 5, wherein the operations further comprise:
- selecting, based on the second determination, the first frequency band combination; and
- causing the second user equipment to utilize the first frequency band combination for CA based communications.

7. The device of claim 5, wherein the operations further comprise:

selecting, based on the second determination, a second frequency band combination referenced by the second index; and causing the second user equipment to utilize the second frequency band combination for CA based communications.

8. The device of claim 1, wherein the operations further comprise:

obtaining a third index from a second user equipment; and determining that the third index obtained from the second user equipment does not correspond to a fourth index accessible to the device at a time that the third index is obtained from the second user equipment, resulting in a second determination.

9. The device of claim 8, wherein the operations further comprise:

generating a plurality of candidate frequency band combinations based on the second determination.

10. The device of claim 9, wherein the operations further comprise:

selecting a first candidate frequency band combination included in the plurality of candidate frequency band combinations; and providing the first candidate frequency band combination to the second user equipment.

11. The device of claim 10, wherein the operations further comprise:

obtaining an acceptance from the second user equipment based on the providing of the first candidate frequency band combination to the second user equipment, such that the second user equipment utilizes the first candidate frequency band combination for CA based communications; and based on the obtaining of the acceptance, associating the third index with the first candidate frequency band combination at the device.

12. The device of claim 10, wherein the operations further comprise:

obtaining a rejection from the second user equipment based on the providing of the first candidate frequency band combination to the second user equipment;

storing, at the device, an indication of the rejection in association with the third index;

selecting, based on the obtaining of the rejection, a second candidate frequency band combination included in the plurality of candidate frequency band combinations; and providing the second candidate frequency band combination to the second user equipment.

13. The device of claim 10, wherein the operations further comprise:

ranking, in an order, the plurality of candidate frequency band combinations based on: a relative data transfer capability of each candidate frequency band combination included in the plurality of candidate frequency band combinations, a probability that each candidate frequency band combination included in the plurality of candidate frequency band combinations will be able to be utilized by the second user equipment for CA based communications, or a combination thereof, wherein the selecting of the first candidate frequency band combination is based on the order.

14. The device of claim 9, wherein the generating of the plurality of candidate frequency band combinations is based on a use of machine learning, artificial intelligence, or a combination thereof.

15. The device of claim 9, wherein the generating of the plurality of candidate frequency band combinations is based on: an identification of at least one application executed by the second user equipment, a load accommodated by the device, an identification of a make and model of the second user equipment, or any combination thereof.

16. The device of claim 1, wherein the causing the first user equipment to utilize the first frequency band combination for CA based communications comprises transmitting a message or a signal to the first user equipment.

17. A non-transitory machine-readable medium, comprising executable instructions that, when executed by a processing system including a processor, facilitate performance of operations, the operations comprising:

obtaining an index from a communication device;

configuring the communication device to engage in carrier aggregation (CA) based communications utilizing a first frequency band combination when the index matches a second index accessible to the processing system at a time when the index is obtained from the communication device, wherein the second index is associated with a plurality of frequency band combinations and the first frequency band combination is included in the plurality of frequency band combinations; and generating and providing at least one candidate frequency band combination to the communication device when the index does not match any of a plurality of indices accessible to the processing system at the time when the index is obtained from the communication device, wherein the plurality of indices includes the second index.

18. The non-transitory machine-readable medium of claim 17, wherein the index matches the second index, and wherein the operations further comprise:

determining that the first frequency band combination supports a first throughput that is greater than a second throughput associated with a second frequency band combination included in the plurality of frequency band combinations, wherein the configuring is based on the determining.

19. A method, comprising:

obtaining, by a processing system including a processor, an index pertaining to a use of carrier aggregation (CA) from a first user equipment;

determining, by the processing system, that the processing system lacks a profile corresponding to the index at a time that the index is obtained from the first user equipment, resulting in a first determination;

sending, by the processing system and based on the first determination, a request to a second processing system for an indication of whether the second processing system has a copy of the profile corresponding to the index;

receiving, by the processing system and based on the sending of the request, a response from the second processing system indicating that the second processing system has the copy of the profile corresponding to the index, the response including the copy of the profile; and storing, by the processing system and based on the receiving, the copy of the profile, resulting in a stored profile.

20. The method of claim 19, wherein the stored profile references a plurality of frequency band combinations in a ranked order, the method further comprising:

selecting, by the processing system and based on the ranked order, a first frequency band combination from the stored profile;

configuring, by the processing system and based on the selecting of the first frequency band combination, the first user equipment to utilize the first frequency band combination for CA based communications;

obtaining, by the processing system and subsequent to the configuring of the first user equipment, the index from a second user equipment;

selecting, by the processing system and based on the ranked order and the obtaining of the index from the second user equipment, a second frequency band combination from the stored profile to balance, within a threshold, a load between the first frequency band combination and the second frequency band combination; and configuring, by the processing system and based on the selecting of the second frequency band combination, the second user equipment to utilize the second frequency band combination for CA based communications.

* * * * *